May 14, 1929.    R. E. PARIS    1,712,901
AUTOMATIC STOP FOR TABULATING MACHINES
Filed June 9, 1925    3 Sheets-Sheet 2
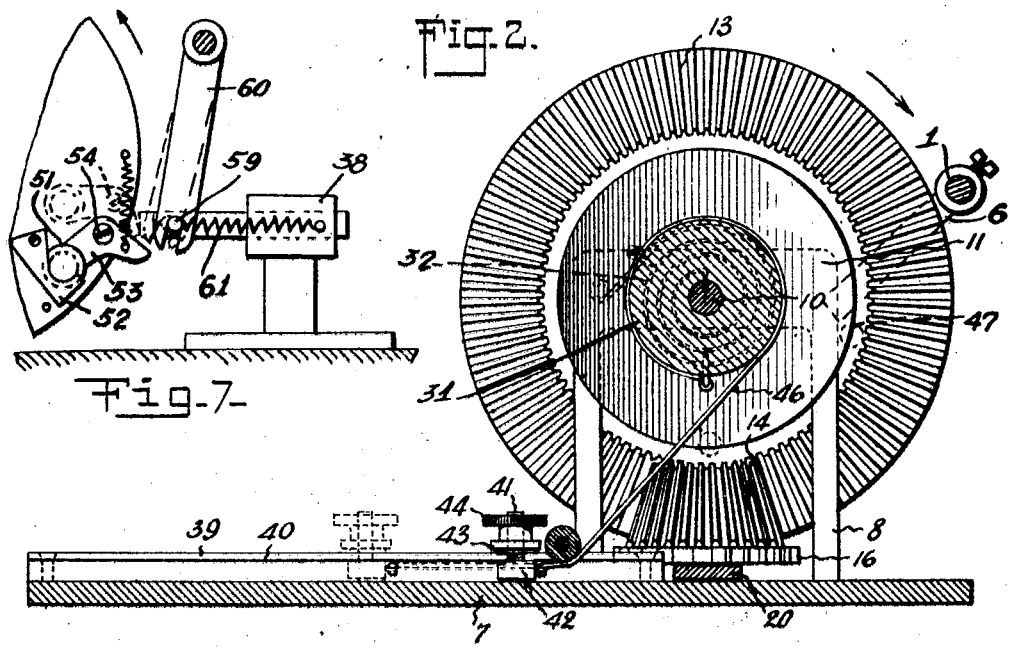
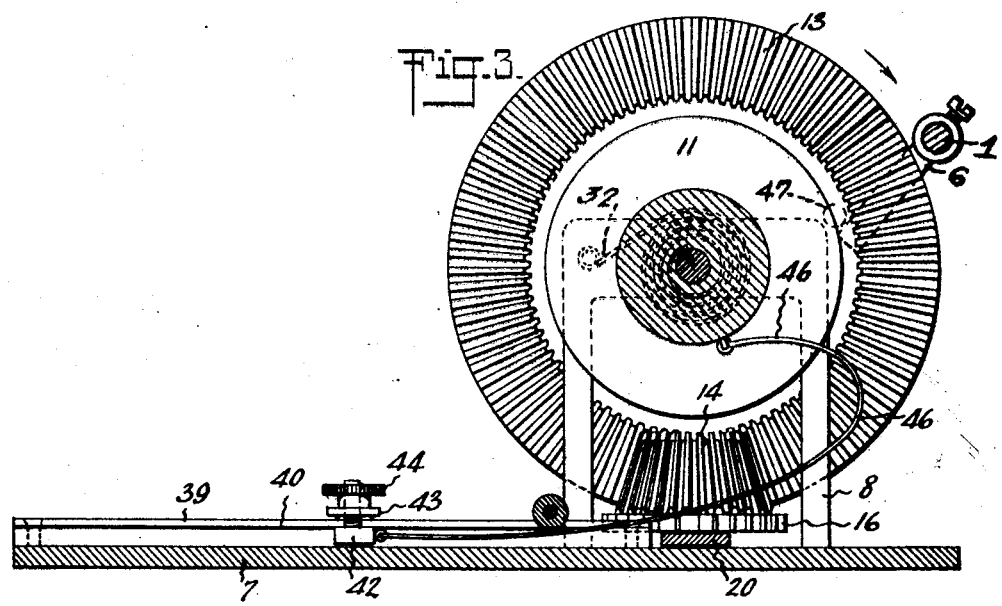
WITNESSES
William P. Goebel,
SW. Poster
INVENTOR
Robert E. Paris
BY
ATTORNEYS May 14, 1929.  R. E. PARIS  1,712,901
AUTOMATIC STOP FOR TABULATING MACHINES
Filed June 9, 1925    3 Sheets-Sheet 3

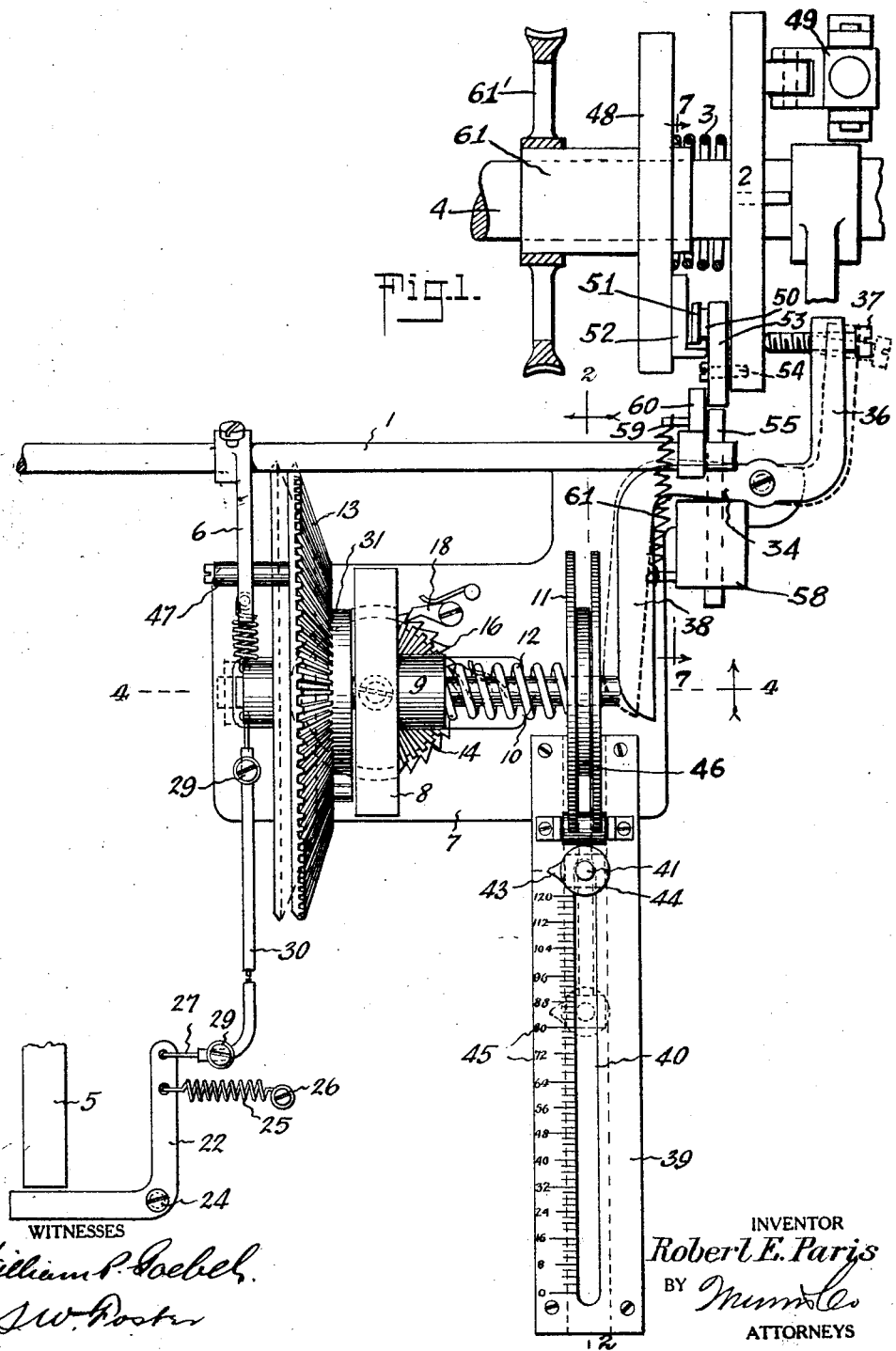

WITNESSES
William A. Goebel
S. W. Foster

INVENTOR
Robert E. Paris
BY Munn & Co
ATTORNEYS

Patented May 14, 1929.

1,712,901

UNITED STATES PATENT OFFICE.

ROBERT E. PARIS, OF NEW YORK, N. Y.

AUTOMATIC STOP FOR TABULATING MACHINES.

Application filed June 9, 1925. Serial No. 36,033.

This invention is an automatic stop for tabulating machines, an object of the invention being to provide an apparatus of this character which can be attached to any standard type of tabulating machine, and which can be set so as to permit tabulation of any desired number of lines and then automatically stop the machine.

Heretofore it has been necessary to manually stop the tabulating machine after it has tabulated the desired number of lines, and as such machines are power driven they require very careful and close attention if the tabulation is to be stopped after any particular number of lines has been tabulated.

It is the purpose of my invention therefore to provide an apparatus which can be set for any desired number of lines, and when such number of lines has been tabulated the machine will be automatically stopped, and when manually started the tabulation of the same number of lines may be repeated as often as desired, the machine automatically stopping when the desired number of lines has been tabulated.

With these and other objects in view, the invention consists in certain novel features of construction and combinations and arrangements of parts, which will be more fully hereinafter described and pointed out in the claims.

In the accompanying drawings—

Figure 1 is a plan view somewhat diagrammatically illustrating my improved apparatus operatively connecting such parts of a tabulating machine as co-operate therewith;

Figure 2 is a view in longitudinal section on the line 2—2 of Figure 1, showing the parts in one extreme position;

Figure 3 is a similar view, showing the parts in a set position and in course of operation;

Figure 7 is a fragmentary view in side elevation illustrating a clutch disengaging means.

Figure 4:
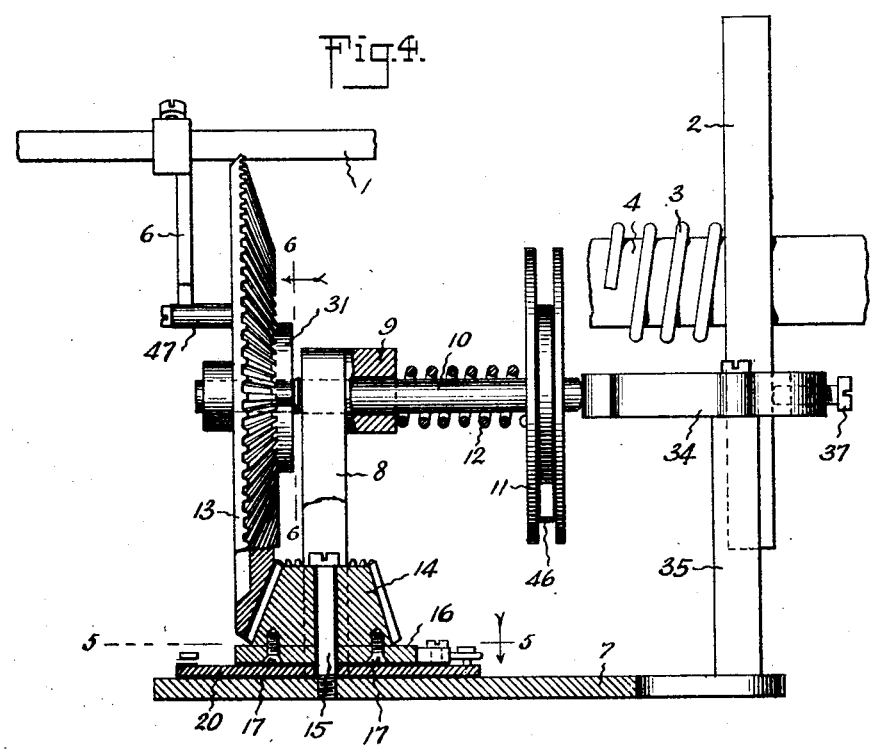
Figure 4 is a view in section on the line 4—4 of Figure 1.
Figure 5:
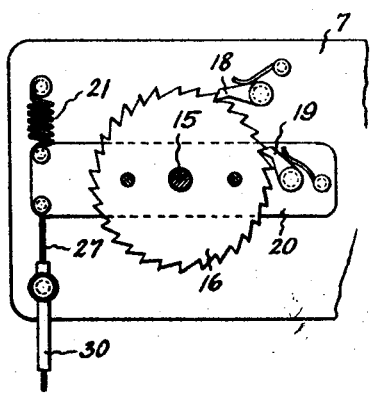
Figure 5 is a fragmentary sectional plan view taken on the line 5—5 of Figure 4.

This invention is particularly designed for use in connection with the well known Powers tabulating machine, the main features of which are illustrated in Patent No. 1,245,502, dated November 6, 1917. In lieu of the clutch illustrated in said patent in Figure 2, comprising the movable pinion $3^a$, I shall illustrate and describe the clutch mechanism which is used on the Powers type of machine, and to which my invention is particularly adapted.

Referring especially to Figure 1, 1 represents a stop shaft of the tabulating machine. 4 represents the main tabulator shaft on which a disk 2 is keyed. On the shaft 4 a tubular drive shaft 61 is mounted and carries a clutch disk 48. This shaft 61 is driven by a worm wheel 61' from any suitable source of power, and motion is transmitted to the shaft 4 when the clutch disks 48 and 2 are locked together. A coil spring 3 is interposed between the disks and located around the shaft 4 and tends to force the disks or plates apart to release the clutch member.

The disk 2 is moved toward the disk 40 by a manually operated lever 49, and when moved toward the disk 48 a stud 50 having an annular head 51 thereon is moved into the path of a grooved housing 52 on disk 48 so that the disks are locked together. This stud 50 is carried by a pivoted dog 53 which is pivotally connected between its ends to the disk 2, as shown at 54, and one end of the dog 53 is adapted to engage a plunger 55 movable in a guide 58, when said plunger is projected far enough, as will be explained. This plunger 55 has a pin 59 thereon which is movable in a slotted crank arm 60, and the latter is fixed to shaft 1. A coil spring 61 connects the pin 59 with a support 58 and normally holds the plunger 55 out of the path of the dog 53. When this plunger 55 is moved forwardly by the turning action of shaft 1 the free end of the dog 53 will strike the same and throw the stud 50 out of engagement with the housing 52 and the spring 3 will force the clutch disk or plate 2 to the right of Figure 1 and stop the tabulating operation. The tabulating machine is also provided with a reciprocating part 5, which reciprocates as each line is tabulated.

The above parts are common to the Powers type of machine in general use and form no part of the present invention except that my improvements co-operate therewith in performing their functions.

The parts above described constitute standard equipment in a tabulating machine, and I have illustrated these parts diagrammatically in order to illustrate the operation of my improved apparatus, which will now be described in detail.

On the stop shaft 1 I provide a crank arm 6 which is moved automatically by my improved apparatus to stop the tabulating machine after a predetermined number of lines has been tabulated. I preferably provide a supporting baseplate 7 having an upright frame 8 thereon, the latter having an extended bearing sleeve 9, in which a shaft 10 is mounted to turn.

A reel 11 is fixed to the shaft 10 adjacent one end thereof, and a coil spring 12 is located on the shaft 10 between the bearing 9 and the reel 11, tending to move the shaft in one direction. On the opposite end of this shaft 10 I secure a relatively large bevel gear wheel 13 which meshes with a smaller bevel gear wheel 14 mounted on a journal bolt 15 which is preferably screwed into the base 7, as illustrated in Figure 4.

In practice, the gear wheel 14 will have thirty teeth and the gear wheel 13 will have one hundred and fifty teeth, although of course it is to be understood that the invention is not limited to the precise number of teeth of the gears.

A ratchet wheel 16 is secured to turn with the bevel gear wheel 14, is located under the bevel gear wheel, and may be removably secured thereto by screws 17. A spring-pressed pawl 18 on the base plate 7 engages the ratchet wheel 16 to prevent retrograde movement thereof, and forward movement is imparted to said ratchet wheel and to the gear wheel 14 by means of a spring-pressed pawl 19 carried by a lever 20. This lever 20 is pivotally supported between its ends on the journal bolt 15 and is connected by a coil spring 21 with the plate 7 to hold the lever in normal position and return it to such position.

22 represents a bell crank lever pivotally supported as shown at 24 and having one arm thereof in the path of the reciprocating member 5. A coil spring 25 connects the lever 22 with a fixed part 26 so as to hold the lever in normal position and return it to such position. One arm of this lever 22 is connected by a flexible member 27, such as a wire, cable or other device, with the lever 20 and is guided in its movement through a tubular casing 30, suitably fixed at its ends as illustrated at 29 so as to guide the movement of the flexible connecting device 27.

Figure 6:
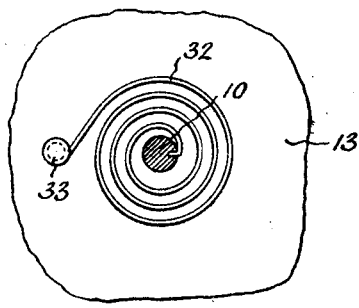
Figure 6 is a fragmentary view in vertical section on the line 6—6 of Figure 4.

The gear wheel 13 has a concentric spring casing 31 thereon on which a convolute spring 32 is mounted. One end of this spring is fixed to the gear wheel as shown at 33, and the other end is secured to turn with the shaft 10, all of which is illustrated in detail in Figures 4 and 6, so as to impart rotary movement to the shaft 10 for a purpose which will hereinafter appear.

34 represents a lever which is pivotally mounted on a post 35 on base plate 7. One arm 36 on this lever carries the set screw 37 which engages the clutch plate 2 and is capable of adjustment for best results. Another arm 38 on the lever 34 normally bears against the end of shaft 10 so that when the clutch plate 2 is moved to the right of Figure 1 the lever 34 will operate to force the shaft 10 to the left of Figure 1 and move the gear wheel 13 out of mesh with the gear wheel 14.

A scale plate 39 is fixed to the plate 7 and has a longitudinal slot 40 therein through which a set screw 41 projects. This set screw is carried by a block 42 located below the plate 39 and is projected through a pointer disk 43 above the plate 39, and a thumb nut 44 is located on the screw so as to clamp the pointer and the other parts associated therewith at any desired adjustment of the scale plate 39.

This plate 39 has a scale 45 thereon which indicates lines of tabulation, and it is of course to be understood that any desired number of lines may be indicated by the scale.

The block 42 is connected by a strap 46 with the reel 11 and this strap may be of flexible metal or other suitable material which will not stretch and which may answer the purpose.

The strap 46 is wound on the reel 11 so that when the reel is turned by the gear wheel 13, the strap will be unwound from the reel.

A crank pin 47 is fixed to the large gear wheel 13 and is adapted to engage the crank arm 6 to operate the stop shaft 1, as will now be explained.

The operation is as follows:

Figures 1, 2 and 4 illustrate the parts in their normal position. To set the apparatus to tabulate the desired number of lines, the set screw 41 is loosened and the pointer plate 43 is moved longitudinally of scale plate 39 until it registers on the scale the number of lines to be tabulated. This movement of the set screw 41 causes the block 42 to be moved and to impart a turning movement to the reel 11, shaft 10 and gear wheel 13, it being understood that this movement is permitted because of the fact that the large gear wheel 13 is out of mesh with the gear wheel 14, or, in other words, in the dotted line position shown in Figure 1.

The plate 2 is then manually turned to the full line position shown in Figure 1 to cause the machine to start its tabulating movement, and allow the lever 34 to assume the full line position shown in Figure 1 so that the spring 12 can move the shaft 10 longitudinally and bring the gear wheel 13 into mesh with the gear wheel 14. As each line is tabulated, the reciprocating member 5 will cause a pivotal movement of the bell crank 22, and the latter, through the medium of the flexible connecting device 27, will impart an oscillating movement to the lever 20, and the latter, through the medium of the spring-pressed pawl 19, will move the ratchet wheel 16 a distance of one tooth. As this ratchet wheel 16 is fixed to turn with the gear wheel 14 said gear wheel 14 and the gear wheel 13 will be moved a distance of one tooth at each oscillation of the lever 20.

Each complete oscillation of the lever 20 takes place upon the tabulating of a line on the tabulating machine, so that the gear wheel 13 will be moved a distance of one tooth as each line is tabulated. This gear wheel will always turn in the direction of the arrows, as indicated in Figures 2 and 3. As the gear wheel 13 completes its movement after the tabulation of the last line for which the machine has been set the crank pin 47 will engage the crank arm 6, partially turn the stop shaft 1 and release the clutch plate 2 so that the latter can move to its dotted line position (Figure 1), and into engagement with the screw 37 of the arm 36 of the lever 34 and force the arm 38 of said lever into engagement with the shaft 10 to move it longitudinally and thereby throw the gears 13 and 14 out of mesh and instantly stop the machine. As soon as the gears are thrown out of mesh the convolute spring 32 which has been wound by the turning movement of gear wheel 13, will impart a turning movement to the shaft 10 and reel 11 in the reverse direction to wind the strap 46 thereon as far as the strap winding on reel will permit.

If it is desired to repeat the tabulation of the same number of lines, it is simply necessary to start the machine by moving the clutch plate 2, when the operation above described will be repeated.

The manner in which the setting of the indicator brings about the stopping of the machine at a definite time may be concisely stated as follows: The gear wheel 13 is turned while out of mesh with pinion 14 by the manual movement of the pointer 43 which exerts a turning movement to the reel 11 and the gear wheel 13 fixed to turn therewith. This movement of the gear wheel carries the pin 47 a predetermined distance away from the arm 6. After this adjustment is made the position of the pointer is fixed or secured. When the machine is started and the gear 13 is in mesh with pinion 14, the gear wheel 13 will be moved a distance of one tooth as each line is tabulated, and the direction of this movement will be clockwise, as shown in Figure 3, giving slack to strap 46. When the pin 47 engages the arm 6, it will cause the machine to stop tabulating, as above explained, and the gear wheel 13 will be moved out of mesh with pinion 14 and the coil spring 32 which has been wound by the former movement of the gear wheel will now quickly revolve in the opposite direction, winding the strap 46 on the reel 11 as far as such movement is permitted by the position of the pointer. Hence, the position of the pointer determines the amount of strap which may be wound on the reel, and the greater amount of strap which can be wound will permit a greater movement or a greater number of lines to be tabulated.

It will be noted that by the scale in Figure 1, when the pointer is pulled out to the extreme position, it will be at zero so far as the tabulating lines are concerned, and by moving the same along the scale it can be secured at any point to determine the number of lines. It is therefore this return movement of the gear wheel and the drum which determine the number of lines to be tabulated, and the pointer can be set at any desired position on the scale so as to determine this operation. Hence, in operating the machine, it is simply necessary for the operator to move the clutch disk 2 into engagement with the clutch disk 48, when the machine will tabulate the number of lines indicated by the pointer on the scale, and then the clutch will be thrown out and the operation will cease until the lever is again moved to throw the clutch disk into coupled engagement.

Various slight changes and alterations might be made in the general form of the parts described without departing from my invention, and hence I do not limit myself to the precise details set forth but consider myself at liberty to make such slight changes and alterations as fairly fall within the spirit and scope of the appended claims.

I claim:

1. An apparatus of the character described, adapted for attachment to a tabulating machine, and including means for stopping the apparatus in accordance with the number of lines to be tabulated, means for setting in action the stopping means when a predetermined number of lines have been tabulated.

2. An apparatus of the character described, including means for stopping the operation of a tabulating machine, a scale indicating lines of tabulation, and means movable relative to the scale and adapted to be secured in a position on the scale means connecting the movable means with the stopping means for the tabulating machine for controlling the stopping means and rendering the same active when a predetermined number of lines have been tabulated, as indicated on the scale by the movable means.

3. An apparatus of the character described, including a support, a pair of gear wheels on the support, means for imparting a step by step motion to one of the gear wheels, means for moving one of the gear wheels into and out of mesh with the other gear wheel, means for manually moving the last-mentioned gear wheel a predetermined distance, means on the last-mentioned gear wheel for stopping a tabulating machine, and means for rotating the last mentioned gear wheel through a predetermined angle of rotation for positioning the stopping means of said gear wheel so that it will act to cause stopping of the tabulating machine at a point when the gear wheel is reversely rotated.

4. An apparatus of the character described, including a base plate, a longitudinally movable and rotary shaft mounted on the base plate, a large bevel gear wheel secured on said shaft, a reel secured on said shaft, a small bevel gear wheel constituting a driving gear for the first mentioned gear wheel, a spring tending to move the shaft in a direction to maintain the gear wheels in mesh, a crank pin on the large gear wheel adapted to stop the operation of a tabulating machine, a lever operated by the tabulating machine when the latter is stopped to move the shaft longitudinally and move the large gear wheel out of mesh with the small gear wheel, and means for setting the large gear whereby it is moved a predetermined distance before stopping the tabulating machine.

5. An apparatus of the character described, including a base plate, a longitudinally movable and rotary shaft mounted on the base plate, a large bevel gear wheel secured on said shaft, a reel secured on said shaft, a small bevel gear wheel constituting a driving gear for the first mentioned gear wheel, a spring tending to move the shaft in a direction to maintain the gear wheels in mesh, a crank pin on the large gear wheel adapted to stop the operation of a tabulating machine, a lever operated by the tabulating machine when the latter is stopped to move the shaft longitudinally and move the large gear wheel out of mesh with the small gear wheel, means for setting the large gear wheel whereby it is moved a predetermined distance before stopping the tabulating machine, said last mentioned means including a scale plate, a device adapted to register with the scale plate and to be secured at any position thereon, and a flexible strap connecting the reel and the adjustable member.

6. An apparatus of the character described, including a base plate, a longitudinally movable and rotary shaft mounted on the base plate, a large bevel gear wheel secured on said shaft, a reel secured on said shaft, a small bevel gear wheel constituting a driving gear for the first mentioned gear wheel, a spring tending to move the shaft in a direction to maintain the gear wheels in mesh, a crank pin on the large gear wheel adapted to stop the operation of a tabulating machine, a lever operated by the tabulating machine when the latter is stopped to move the shaft longitudinally and to move the large gear wheel out of mesh with the small gear wheel, means for setting the large gear wheel whereby it is moved a predetermined distance before stopping the tabulating machine, said last mentioned means including a scale plate, a device adapted to register with the scale plate and be secured at any position thereon, a flexible strap connecting the reel and the adjustable member, and a convolute spring connecting the large gear wheel and the shaft and functioning to turn the reel to wind the strap thereon after the operation is completed.

7. An attachment for tabulating machines, including a gear wheel, a crank pin on the gear wheel adapted to engage a part of the tabulating machine and stop the operation thereof, a smaller gear wheel normally meshing with the first mentioned gear wheel, a ratchet wheel fixed to turn with the smaller gear wheel, an oscillating lever, a pawl on the lever engaging the ratchet wheel, a spring holding the lever in normal position, a second lever caused to move by the operation of the tabulating machine, and means connecting said levers whereby at each line tabulation the gear wheels are turned a distance of one tooth.

8. An attachment for tabulating machines, including a gear wheel, a crank pin on the gear wheel adapted to engage a part of the tabulating machine and stop the operation thereof, a smaller gear wheel normally meshing with the first mentioned gear wheel, a ratchet wheel fixed to turn with the smaller gear wheel, an oscillating lever, a pawl on the lever engaging the ratchet wheel, a spring holding the lever in normal position, a second lever caused to move by the operation of the tabulating machine, means connecting said levers whereby at each line tabulation the gear wheels are turned a distance of one tooth, and means for setting the first mentioned gear wheel whereby it moves through a path of such a length as to permit a predetermined number of lines to be tabulated before the machine is automatically stopped.

9. In combination with a clutch plate, a stop shaft and a reciprocating member of a tabulating machine, of a pair of gear wheels, means operated by the reciprocating member to impart motion to the gear wheels at each reciprocation thereof, means on one of the gear wheels to engage the stop shaft and cause the plate to move in one direction, and means operated by the movement of the plate to throw the gears out of mesh and thereby stop the machine.

10. In combination with a clutch plate, a stop shaft and a reciprocating member of a tabulating machine, of a pair of gear wheels, means operated by the reciprocating member to impart a movement to the gear wheels at each reciprocation thereof, means on one of the gear wheels to engage the stop shaft and cause the plate to move in one direction, means operated by the movement of the plate to throw the gears out of mesh and thereby stop the machine, and means for setting the gear wheel while the gears are out of mesh.

11. In a tabulating machine, a stopping mechanism, means for setting the stopping mechanism according to the number of lines to be tabulated, and means for rendering the stopping mechanism active to stop the machine when the number of lines to which it is set have been tabulated.

12. In a tabulating machine, a stopping mechanism including a wheel, means for setting the wheel according to the number of lines to be tabulated, means for imparting a step movement to the wheel as each line is tabulated, and means whereby the machine will be stopped when the last line has been tabulated.

13. In a tabulating machine, a stopping mechanism including a gear wheel, means for setting the wheel according to the number of lines to be tabulated, means for operating the gear wheel to move it one tooth as each line is tabulated, and means on the gear wheel for rendering the stopping mechanism active and the machine thereby stopped when the last line has been tabulated.

ROBERT E. PARIS.